(12) United States Patent
Denber (10) Patent No.: US 6,711,306 B1
(45) Date of Patent: Mar. 23, 2004

(54) AUTOMATIC BRIGHT WINDOW DETECTION

(75) Inventor: Michele Denber, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 690 days.

(21) Appl. No.: 09/586,439

(22) Filed: Jun. 2, 2000

(51) Int. Cl.[7] .................................................. G06K 9/60
(52) U.S. Cl. ........................ 382/308; 382/190; 382/260
(58) Field of Search ................................ 382/103, 105, 382/131, 173, 274, 275, 260, 308, 284, 190, 266, 255; 356/226; 348/223, 224, 169; 358/1.9; 345/803

(56) References Cited

U.S. PATENT DOCUMENTS

| | | | | |
|---|---|---|---|---|
| 4,373,810 A | * | 2/1983 | Shreve ......................... 356/226 |
| 5,227,837 A | | 7/1993 | Terashita ....................... 355/38 |
| 5,305,204 A | * | 4/1994 | Ohhashi ......................... 382/131 |
| 5,392,091 A | * | 2/1995 | Iwasaki ......................... 396/234 |
| 5,426,879 A | * | 6/1995 | Hecker ........................... 40/427 |
| 5,475,812 A | * | 12/1995 | Corona et al. ................... 345/807 |
| 5,481,628 A | | 1/1996 | Ghaderi ......................... 382/261 |
| 5,715,377 A | * | 2/1998 | Fukushima et al. ............. 358/1.9 |
| 5,828,793 A | * | 10/1998 | Mann ............................. 382/284 |
| 5,838,830 A | | 11/1998 | Qian et al. ...................... 382/243 |
| 5,877,809 A | | 3/1999 | Omata et al. ................... 348/345 |
| 5,974,190 A | * | 10/1999 | Maeda et al. ................... 382/255 |
| 5,978,443 A | * | 11/1999 | Patel ............................. 378/62 |
| 6,147,705 A | * | 11/2000 | Krauter et al. ................. 348/224.1 |
| 6,240,217 B1 | * | 5/2001 | Ercan et al. ................... 382/274 |
| 6,297,889 B1 | * | 10/2001 | Loce et al. ..................... 358/1.9 |

* cited by examiner

Primary Examiner—Bhavesh M. Mehta
Assistant Examiner—Kanji Patel
(74) Attorney, Agent, or Firm—David M. Woods (57) ABSTRACT

A method for automatically processing a digital image to locate one or more windows that are substantially brighter than their surroundings begins by processing the digital image to compute a feature image identifying the location of features in the image based on a weighted contribution of edge information, brightness information, information corresponding to spatial activity and occlusion boundary information. Then the feature image is processed with one or more morphological filtering operations to provide edge smoothing and noise removal, thereby generating a filtered image. The filtered image is processed to identify zero or more regions, wherein the presence of one or more regions provides a segmented image, and the segmented image is logically combined with the occlusion boundary information to provide zero or more window candidates. Actual windows are deduced by verifying zero or more of the window candidates based on their mean intensity relative to the mean intensity of the digital image.

20 Claims, 7 Drawing Sheets

FIG. 16

# AUTOMATIC BRIGHT WINDOW DETECTION

FIELD OF THE INVENTION

The invention relates generally to the field of image processing, and in particular to image processing techniques used for locating specific features in images.

BACKGROUND OF THE INVENTION

Extremely bright image regions can be the source of significant neutral channel errors in a scene balance algorithm (SBA). Indoor pictures photographed with a window through which bright daylight is visible are a common instance of this problem. This situation can result in a severe backlighting condition. Being able to detect these features could enable improved SBA performance as well as provide other useful information about the scene, such as the image location (specifically, indoor vs. outdoor), the orientation of the image, and the detection of the main subject.

It is known to use the brightness of particular portions of the scene in order to adjust exposure. For instance, in U.S. Pat. No. 5,227,837, the brightness of an object is estimated by using the brightness information recorded at the time of taking the object image. As a result, it is possible to discriminate correctly those measurement points which are unnecessary for scene discrimination or exposure control, thereby realizing highly precise exposure control. In doing this, the object is subjected to photometry at divisional areas at the time of taking the object image, and the obtained photometric values at divisional areas are used in discriminating the type of recorded scene.

A number of different techniques are well known and available for the detection and location of objects in a scene. For example, the use of edge detection combined with neural networks is disclosed in U.S. Pat. No. 5,481,628 for object detection. The use of vertex identification for object detection is taught by U.S. Pat. No. 5,838,830. U.S. Pat. No. 5,848,190 relies on pattern matching for object detection, while U.S. Pat. No. 5,877,809 extracts a target object based on a calculated object distance. While generally addressing the subject of object detection, none of these references address the unique issues of window detection.

Since there is a rich literature on object detection in the field of computer vision, it is tempting to think of window detection in those terms, with "windows" as being just another type of object whose detection can be performed by applying traditional methods. Unfortunately, window detection is qualitatively different from other types of object recognition in that windows can come in a seemingly infinite variety of appearances. WordNet (a public domain online hyperlinked dictionary) defines 22 different hyponyms (kinds of) for windows. The main feature of a window in an image isn't even the window itself, since that is by definition transparent, or largely so. In fact, Webster's dictionary defines a window as "an opening in the wall of a building". Interestingly, WordNet takes the opposite tack and defines a window as a "framework of wood or metal that contains a glass windowpane".

It would appear that windows are recognized by humans through some high level semantic processing, largely by their edges and the discontinuity between the image content inside and outside of the window region. However, recognizing windows simply as panes of glass is not practical since glass is normally transparent. Nor can windows be recognized solely by their content since that can be arbitrary. And unfortunately, it is the rule rather then the exception for window edges to be obscured, whether by drapes, curtains, shades and the like, or by occluding objects such as plants or lamps, or even by the main subject of the picture. As the window itself can look out onto anything, there are really very few low-level clues as to its presence. Worse still, many of the low-level features that can be used to characterize windows, such as brightness, corners, or vertical edges, also characterize many other common image features. All of these issues combine to make general "window detection" a very difficult problem indeed.

SUMMARY OF THE INVENTION

It is an object of the invention to automatically identify bright windows in photographic images.

It is a further object to segment a photographic image into regions followed by an analysis of the morphological characteristics of the regions in order to identify a bright window.

The present invention is directed to overcoming one or more of the problems set forth above. Briefly summarized, according to one aspect of the present invention, a method for automatically processing a digital image to locate one or more windows that are substantially brighter than their surroundings begins by processing the digital image to compute a feature image identifying the location of features in the image based on a weighted contribution of edge information, brightness information, information corresponding to spatial activity and occlusion boundary information. Then the feature image is processed with one or more morphological filtering operations to provide edge smoothing and noise removal, thereby generating a filtered image. The filtered image is processed to identify zero or more regions, wherein the presence of one or more regions provides a segmented image, and the segmented image is logically combined with the occlusion boundary information to provide one or more window candidates. Actual windows are deduced by verifying one or more of the window candidates based on their mean intensity relative to the mean intensity of the digital image.

The invention provides the advantage of automatically determining in a photographic image the presence and location of windows that are substantially brighter than their surroundings. Furthermore, it detects the presence of bright windows without the use to template matching or any a priori knowledge of other objects in the scene.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing object and/or feature detection are well known, the present description will be directed in particular to attributes forming part of, or cooperating more directly with, methods, systems and apparatus in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

This invention presents an algorithm for automatically identifying images which contain bright windows that could cause problems for other algorithms, such as scene balance algorithms, by biasing the overall perceived brightness of the image so that the resulting photograph is printed too dark. Backlighting situations are a classical example of this problem and in fact are sometimes created by the presence of a bright window near or behind the intended main subject. For the purposes of this work, the term window is defined as per Webster as an opening in the wall of a building, with additional constraints. Windows must be of sufficient size to be noticeable in the final print at normal viewing distance. Thus windows in cars or boats are ordinarily not considered (unless they form a significant portion of the picture), nor are the windows in a large building seen from such a distance that they merely appear to be small dots and are recognized as being windows primarily by context. However, ordinary windows, such as casement, double-hung, or jalousie are included as well as stained glass windows. Windows need not be rectangular. Round, semicircular, oval, arched, and octagonal windows are not uncommon. Sliding glass doors, storm doors, and skylights are also included. Windows may be open or closed, and may be covered with either transparent or translucent glazing material. However, windows completely covered with an opaque material, such as drapes, blinds, shades or shutters are ordinarily excluded. Interior windows that connect two rooms in the same building are also excluded.

The term bright window is defined to be any window that is noticeably brighter in a visual sense than its surroundings. This definition generally excludes windows viewed from indoors at night (which are ordinarily much darker than their surround) as well as windows in which the intensity of the light coming through the window is approximately the same as the surrounding surfaces. This situation may be encountered on a cloudy day with light-colored interior walls, or an interior illuminated by additional indoor lighting. Implicit in these definitions is that the image containing the window is an indoor scene. Consequently, this invention is not intended to locate bright windows resulting from exterior nighttime views of structures with visible interior lighting.

The window detection algorithm is based on computing a set of low-level features each of which captures a certain visual characteristic considered to be representative of bright windows. The features are represented as a set of image masks and combined additively. The image areas that contain enough "votes" from the sum of the features to reach a certain threshold are considered to be bright windows. The advantage of this approach is that it can provide a relative confidence measure for each area found rather than a simple yes/no decision. It also helps suppress false alarms from image areas that may respond very well to only one feature since all features have an equal opportunity to contribute to the voting process. The mask format also automatically provides the location in the image of the window regions identified.

Figure 1:
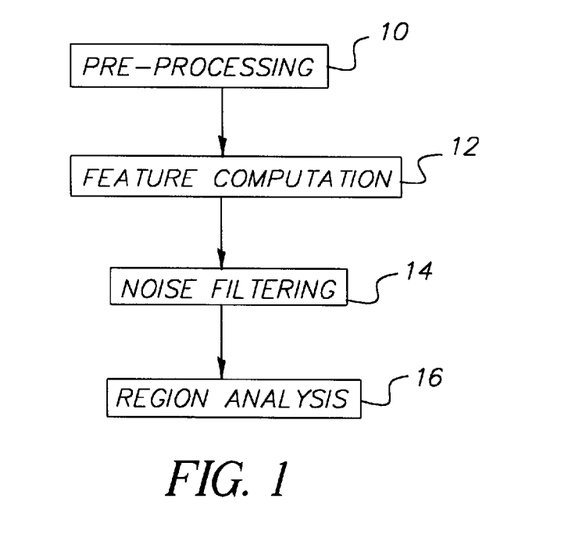
FIG. 1 is an overall block diagram of the window detection algorithm according to the invention.

The process is described in FIGS. 1–4 in relation to an exemplary image, which is shown in FIGS. 5–15 at various stages in the process. Referring now to FIG. 1, the overall process includes a pre-processing stage 10, a feature computation stage 12, a noise filtering stage 14, and a region analysis stage 16. In the pre-processing stage 10, the image is processed to render it into a luminance image of size 192×128 pixels suitable for subsequent processing. Initially, according to the preferred embodiment, a 512×768 pixel 12-bit color (r,g,b) input image is read in and converted to a luminance image (FIG. 5) by the common approximation of (r+g+b)/3. The result is scaled down (e.g. by a conventional nearest neighbor subsampling method) to 192×128 pixels forming a processed image $I_{old}$. While subsampling in general results in noisier images than pixel averaging, it preserves luminance differences that might be useful in window identification.

Figure 2:
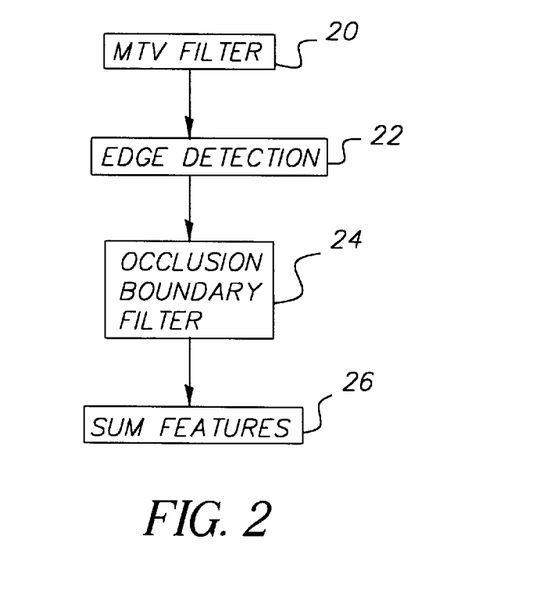
FIG. 2 is a block diagram showing further details of the feature computation stage shown in FIG. 1.

FIG. 2 shows the feature computation stage 12 in further detail, including subsidiary stages 20, 22, 24 and 26. In the filter stage 20, a minimum total variance (MTV) filter operation is performed on the image $I_{old}$, and the results are saved as a new image $I_{MTV}$. Then, in the edge detection stage 22 an edge detection operation is performed on the image $I_{old}$, and the results are saved as another new image $I_{edge}$; then, in the occlusion boundary stage 24 an occlusion boundary filter operation is performed on the image $I_{old}$, and the results are saved as a further new image $I_{OBF}$; finally, in the summation stage 26 the results of stages 20 through 24 are combined into a new image $I_{sum}$.

The subsampled luminance image $I_{old}$ from the pre-processing stage 10 is applied to a filter in the filter stage 20 in order to generate brightness information corresponding to spatial activity. More specifically, a minimum total variation (MTV) filter is applied in stage 20 over a local 3×3 pixel array neighborhood defined as $$\begin{matrix} a & b & c \\ d & e & f \\ g & h & i \end{matrix}$$

where the MTV filter is defined as $$I_{MTVe}=\min(|a-b|+|b-c|+|d-e|+|e-f|+|g-h|+|h-i|+|a-d|+|d-g|+|b-e|+|e-h|+|c-f|+|f-i|)$$

Figure 7:
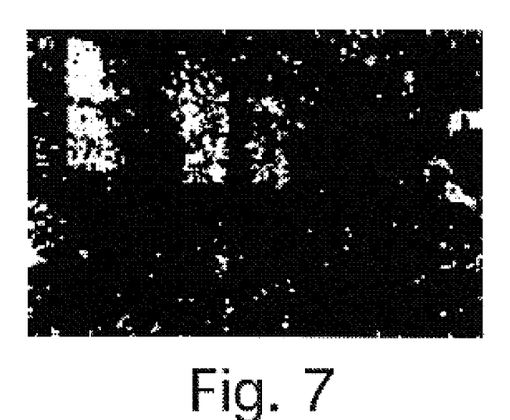
FIG. 7 shows an inverted filtered image output by the filter stage shown in FIG. 2.

Zero values are used as padding where needed for computation of the filter along the image edges. This results in an image $I_{MTV}$. (FIG. 6) whose brightness is directly proportional to spatial activity at any given point. The result is inverted so that higher values correspond to lower spatial activity and the highest valued 2% of the result is saved in the image $I_{MTV}$ (FIG. 7). This is done so that this image can be combined with other subsequent ones via simple addition in the summation stage 26.

Figure 8:
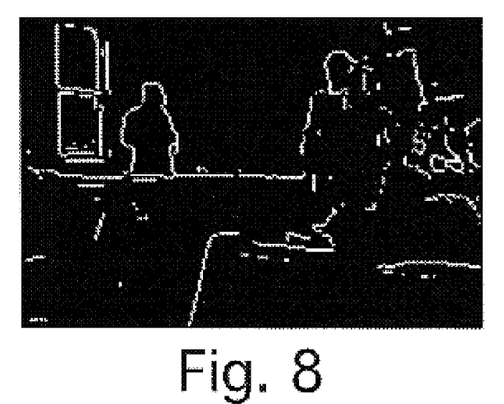
FIG. 8 shows an edge image output by the edge detection stage shown in FIG. 2.

Next, an edge detector is applied in the edge detector stage 22 to the subsampled luminance image $I_{old}$ from the pre-processing stage 10 to form the image $I_{edge}$ (FIG. 8). A desirable edge detector would provide the greatest number of connected significant edges with the fewest number of extraneous edges; a Prewitt edge detector was empirically determined to meet this criterion, although other detectors may be used with less desirable results. The Prewitt operation is defined as the results of convolving the arrays $$\begin{matrix} -1 & 0 & 1 \\ -1 & 0 & 1 \\ -1 & 0 & 1 \end{matrix} \text{ and } \begin{matrix} 1 & 1 & 1 \\ 0 & 0 & 0 \\ -1 & -1 & -1 \end{matrix}$$

Figure 9:
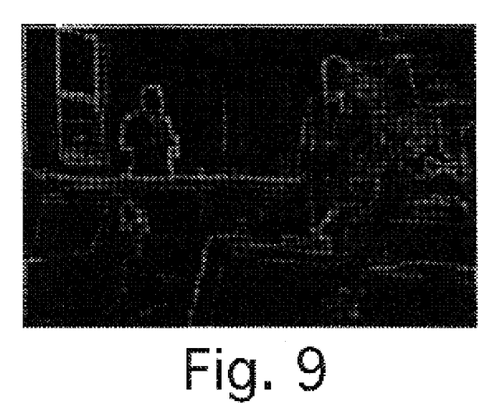
FIG. 9 shows an occlusion boundary image output by the occlusion boundary stage shown in FIG. 2.

The occlusion boundary filter is applied in the occlusion boundary filter stage 24 to the subsampled luminance image $I_{old}$ from the pre-processing stage 10 to form the image $I_{OBF}$ (FIG. 9). Since the presence of windows in indoor images can often give rise to multiple light levels, an occlusion boundary filter (OBF) can be used as an indicator of multiple light levels. Thus the output from the OBF therefore can be a factor arguing in favor of the presence of windows. In this sense, the OBF resembles an ordinary edge detector, except that it responds only to edges where the intensities on opposite sides of the edge exceed a specific threshold value. The important part of the OBF is this threshold value. The OBF is defined for a given image pixel $p_{xy}$ as:

$$OBF(p_{xy}) = \begin{cases} 1 & \text{if } \max(Nk_{xy}) - \min(Nk_{xy}) > t \\ 0 & \text{otherwise} \end{cases}$$

where $Nk_{xy}$ is the completely-connected neighborhood of $p_{xy}$ and t is the threshold intensity. Thus the OBF responds to local intensity differences in the image rather than a fixed global threshold, which tends to result in many more edges being returned, most of which are not of interest in this particular application. In this case, the OBF provides a more selective localization of bright boundaries than conventional edge detection. The OBF can also be used without thresholding, in which case the output is proportional to the intensity across the window under consideration.

Finally, for the output of the feature computation stage 12, the contribution of stages 20–24 are combined, along with the largest 33% of the code values in the subsampled luminance image $I_{old}$ from the pre-processing stage 10, to form a new image $I_{sum}$ (FIG. 10) defined as $$I_{sum}=I_{MTV}/4+(I_{old}>0.66)/2+I_{OBF}/4+I_{edge}/4$$

Figure 10:
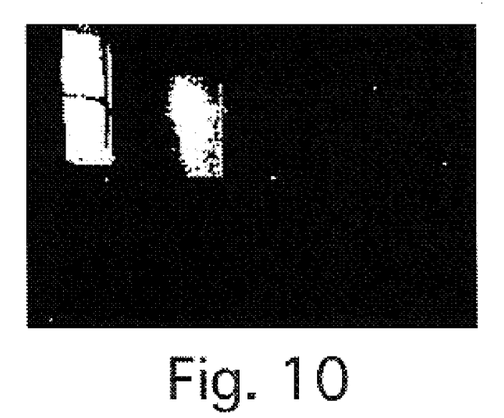
FIG. 10 shows an intermediate image output by the summation stage shown in FIG. 2, resulting from a combination of the images shown in FIGS. 7–9.
Figure 11:
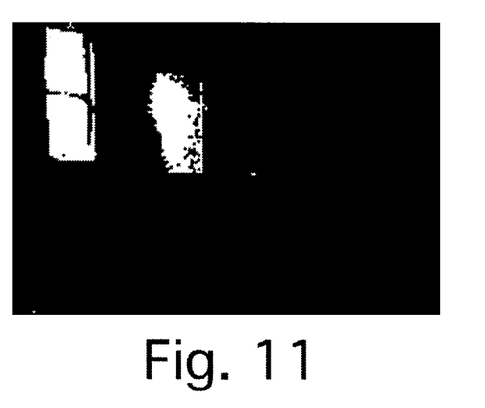
FIG. 11 shows an image output by the pixel removal stage shown in FIG. 3.

The divisions represent empirically determined weightings to adjust the relative contributions of each of the features.

Figure 3:
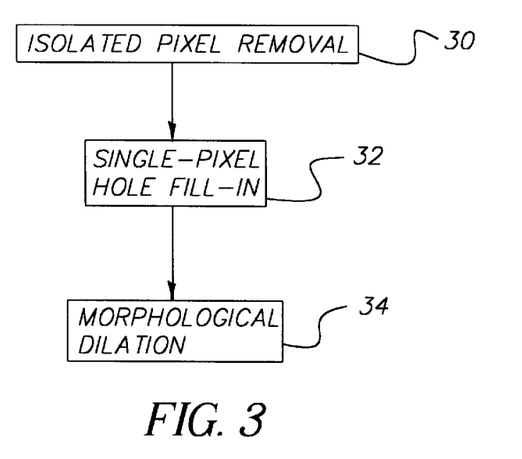
FIG. 3 is a block diagram showing further details of the noise filtering stage shown in FIG. 1.

FIG. 3 shows the noise filtering stage 14 in further detail, including subsidiary stages 30, 32 and 34. In the pixel removal stage 30, isolated single pixels are removed from the image $I_{sum}$ produced by the summation stage 26 in FIG. 2. Then the results of the pixel removal stage 30 are applied to the fill-in stage 32, where isolated single pixel holes in the image are filled in. Finally, the results of fill-in stage 32 are applied to the dilation stage 34 where a morphological dilation operation is performed on the image.

More specifically, in the pixel removal stage 30 any individual isolated pixels in $I_{sum}$ (some of which are visible in FIG. 10) are removed (producing FIG. 11) using a simple morphological filter, as shown below:

| 0 | 0 | 0 |
|---|---|---|
| 0 | 1 | 0 |
| 0 | 0 | 0 |

→

| 0 | 0 | 0 |
|---|---|---|
| 0 | 0 | 0 |
| 0 | 0 | 0 |

Figure 12:
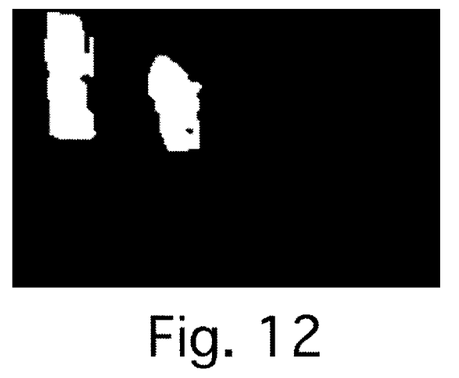
FIG. 12 shows a filled-in image output by the fill-in stage shown in FIG. 3.
Figure 13:
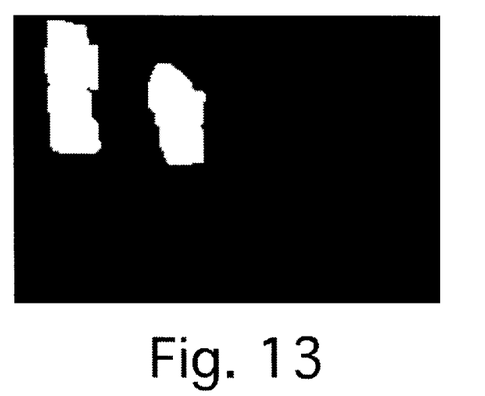
FIG. 13 shows a morphologically dilated image output by the dilation stage shown in FIG. 3.

In the fill-in stage 32, any single-pixel holes in $I_{sum}$ are filled, also using a morphological filter (in this case, the inverse of the preceding step). This is then repeated once to provide some additional fill (as shown in FIG. 12). A morphological dilation operation is performed on the result of the fill-in stage 32, which results in further edge smoothing and filling of small holes (as shown in FIG. 13).

Figure 4:
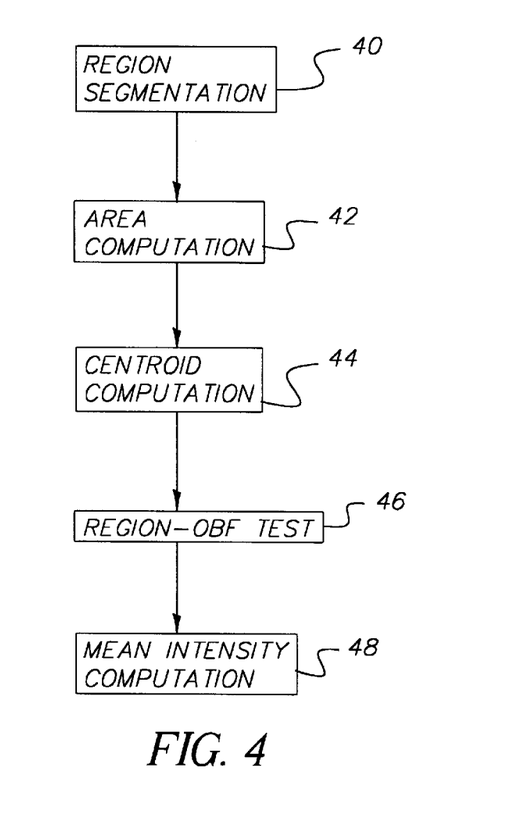
FIG. 4 is a block diagram showing further details of the region analysis stage shown in FIG. 1.
Figure 5:
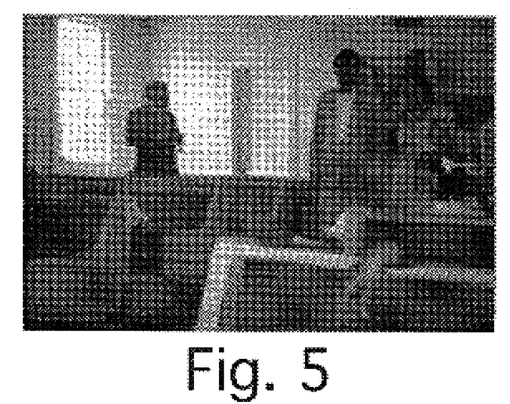
FIG. 5 shows a luminance image, including a bright window, that is processed in the preprocessing stage shown in FIG. 1.
Figure 6:
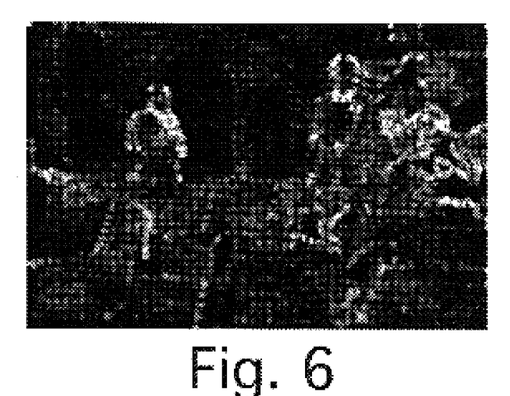
FIG. 6 shows a filtered image generated by the minimum total variation filter in the filter stage shown in FIG. 2.

Finally, FIG. 4 shows the region analysis stage 16 in further detail, including subsidiary stages 40, 42, 44, 46 and 48. In the segmentation stage 40, the image from the dilation stage 34 (FIG. 3) is segmented into a set of individual closed regions. (If the segmentation stage 40 fails to identify any regions (i.e., zero regions), then it is likely that no bright windows are present in the image.) Then the results of the segmentation stage 40 are applied to the area computation stage 42, where the area of each region is computed and regions not meeting a minimum area criterion are excluded from further consideration. Then the results of the area computation stage 42 are applied to the centroid computation stage 44, where the centroid of each remaining region is computed and regions not meeting a given vertical position within the image are excluded from further consideration. Then the results of the centroid computation stage 44 are applied to the exclusion stage 46, where each remaining region is tested for overlap with areas corresponding to the results of stage 24 (i.e., the results of the occlusion boundary filter computation done in connection with FIG. 2) and regions not overlapping are excluded from further consideration. Then the results of stage 46 are applied to the intensity computation stage 48 where the mean intensity of each remaining region is computed and regions not meeting a specified percentage over the mean intensity of the rest of the image outside the identified regions are excluded from further consideration. The remaining regions are the output of the process.

Figure 14:
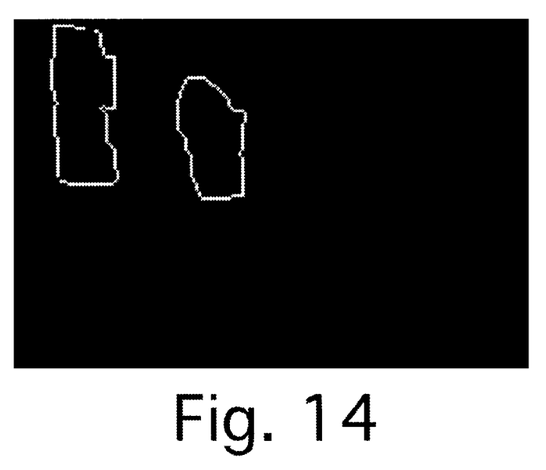
FIG. 14 shows a segmented image output by the segmentation stage shown in FIG. 4.

More specifically, in the segmentation stage 40 the image is segmented into a set of closed regions as shown in FIG. 14. This is accomplished by scanning the image raster fashion until a pixel is found. Then a chain code is constructed starting with that pixel. If the chain returns to the starting pixel, it is labeled as a closed region. Processing then continues with the remainder of the image until all pixels have been processed. This may be also accomplished by a number of different methods as illustrated for example in *Computer Vision* by Dana Ballard and Christopher Brown, chapter 5 (Region Growing). Then the area of each region is computed in the area computation stage 42. Regions smaller than 0.1% of the image area are excluded from consideration as possible windows (this is 25 pixels for a 192×128 pixel image). The two regions in this example have an area of about 154 and 112 pixels.

Next, the centroid of each region is computed in the centroid computation stage 44. Regions whose centroid is not in the upper ⅔ of the image are excluded from consideration as possible windows (this is about 85 pixels for a 192×128 pixel image). Both regions in this example meet this criterion. For the purposes of this illustration, all images are assumed to be oriented correctly. However, note that this step is a heuristic and could be eliminated without fundamentally changing the algorithm, although with some effect on performance. Moreover, one could use the converse of this heuristic to get an orientation detector for determining the orientation of the image.

Figure 15:
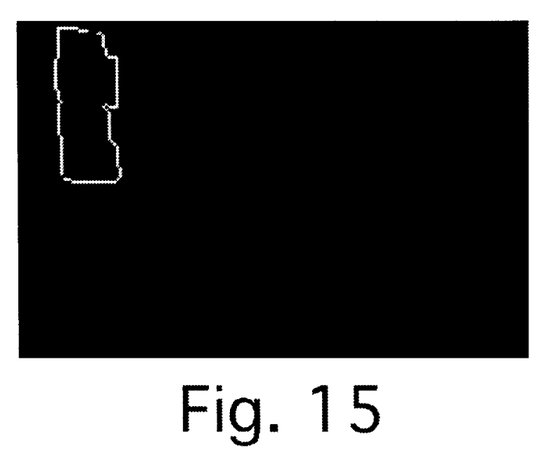
FIG. 15 shows a mask image output by the intensity computation stage shown in FIG. 4.

In the exclusion stage 46, all remaining regions are logically AND'ed with $I_{OBF}$, the mask resulting from the occlusion boundary filter in stage 24 (as shown in FIG. 9). Regions that do not overlap the occlusion boundary filter output at at least a single point are excluded from consideration as possible windows. Neither region in this example was excluded on this basis. Next, in the intensity computation stage 48, the mean intensity of all remaining regions is computed. Regions whose mean is within 20% of the mean of the intensity of the entire original image are excluded from further consideration. The remaining regions are the output of the procedure. Specifically, the algorithm outputs a mask image corresponding to the position of the bright windows in the scene (FIG. 15).

Figure 16:
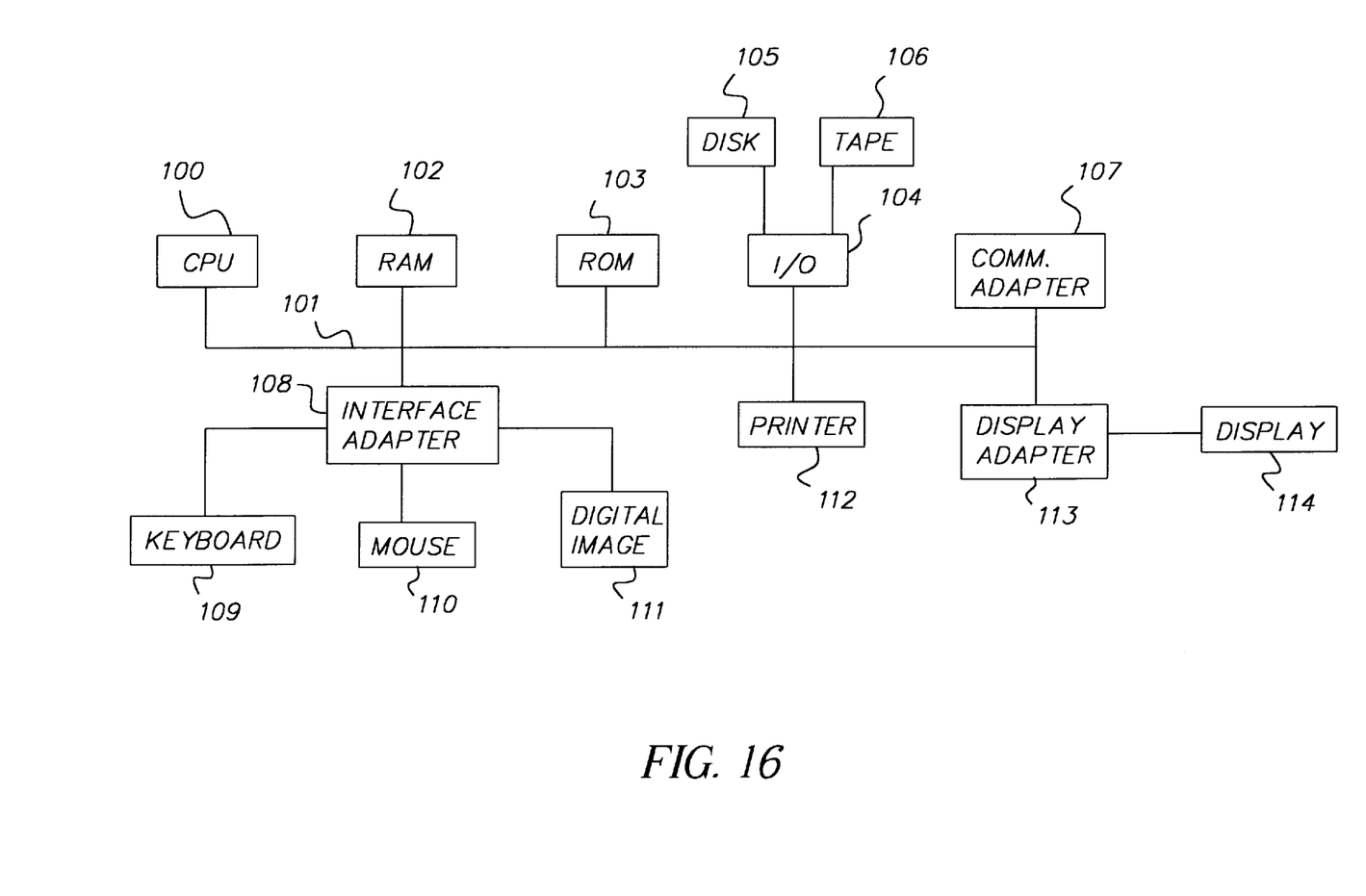
FIG. 16 is a block diagram of a computer system for implementing the present invention.

While the overall methodology of the invention is described above, the invention can be embodied in any number of different types of systems and executed in any number of different ways, as would be known by one ordinarily skilled in the art. For example, as illustrated in FIG. 16, a typical hardware configuration of an information handling/computer system in accordance with the invention preferably has at least one processor or central processing unit (CPU) 100. The CPU 100 is interconnected via a system bus 101 to a random access memory (RAM) 102, a read-only memory (ROM) 103, an input/output (I/O) adapter 104 (for connecting peripheral devices such as disk units 105 and tape drives 106 to the bus 101), a communication adapter 107 (for connecting an information handling system to a data processing network), a user interface adapter 108 (for connecting peripherals 109, 110, 111 such as a keyboard, mouse, digital image input unit (e.g., a scanner), microphone speaker and/or other user interface device to the bus 101), a printer 112 and a display adapter 113 (for connecting the bus 101 to a display device 114). The invention could be implemented using the structure shown in FIG. 16 by including the inventive method within a computer program stored on the storage device 105. Such a computer program would act on one or more image frames supplied through the interface adapter 108 or through the network connection 107. The system would then automatically provide, e.g., the desired mask image shown in FIG. 15 to the CPU 100, the display 414, the printer 412 or to the network 407 for subsequent utilization, such as in an automatic exposure control algorithm implemented by the CPU 100, or resident in the display or printer, or on the network.

The invention has been described with reference to a preferred embodiment. However, it will be appreciated that variations and modifications can be effected by a person of ordinary skill in the art without departing from the scope of the invention.

PARTS LIST

10 pre-processing stage
12 feature computation stage
14 noise filtering stage
16 region analysis stage
20 filter stage
22 edge detection stage
24 Occlusion boundary stage
26 summation stage
30 pixel removal stage
32 fill-in stage
34 dilation stage
40 segmentation stage
42 area computation stage
44 centroid computation stage
46 exclusion stage
48 intensity computation stage
100 CPU
101 bus
102 RAM
103 ROM
104 I/O adapter
105 disk unit
106 tape drive
107 communication adapter
108 interface adapter
109 keyboard
110 mouse
111 digital image input unit
112 printer
113 display adapter
114 display device

What is claimed:

1. A method for automatically processing a digital image to locate one or more windows that are substantially brighter than their surroundings, said method comprising the steps of:

processing the digital image to compute a feature image identifying the location of features in the image based on a weighted contribution of edge information, brightness information, information corresponding to spatial activity and occlusion boundary information;

processing the feature image with one or more morphological filtering operations to provide edge smoothing and noise removal, thereby generating a filtered image;

processing the filtered image to identify zero or more regions, wherein the presence of one or more regions produces a segmented image;

logically combining the segmented image with the occlusion boundary information to provide one or more window candidates; and verifying that one or more of the window candidates are windows based on their mean intensity relative to the mean intensity of the digital image.

2. The method as claimed in claim 1 further comprising the step of evaluating at least one of the area and position of the regions against certain predetermined heuristic parameters to provide further verification of said one or more window candidates.

3. The method as claimed in claim 2 wherein the predetermined heuristic parameters determine whether each region is larger than a predetermined proportion of the image and whether a centroid of each region appears in a predetermined upper portion of the image.

4. The method as claimed in claim 1 wherein the step of computing a feature image comprises using a Prewitt edge detector to generate edge information.

5. The method as claimed in claim 1 wherein the step of computing a feature image comprises using a minimum total variation filter to generate the brightness information.

6. The method as claimed in claim 1 wherein the step of computing a feature image comprises using an occlusion boundary filter responsive to local intensity differences to generate occlusion boundary information.

7. The method as claimed in claim 1 wherein the morphological filtering operations remove isolated pixels and fill in single-pixel holes in the feature image.

8. The method as claimed in claim 1 wherein the morphological filtering operations include a dilation operation.

9. The method for automatically processing a digital image to determine whether the captured scene is indoor or outdoor by locating one or more windows that are substantially brighter than their surroundings, said method comprising the steps of:
   processing the digital image to compute a feature image identifying the location of features in the image based on a weighted contribution of edge information, brightness information, information corresponding to spatial activity and occlusion boundary information;
   processing the feature image with one or more morphological filtering operations to provide edge smoothing and pixel filling, thereby generating a filtered image;
   processing the filtered image to identify zero or more regions, wherein the presence of one or more regions produces a segmented image;
   logically combining the segmented image with the occlusion boundary information to provide one or more window candidates indicative of an indoor scene; and
   determining an indoor scene by verifying that one or more of the window candidates are windows based on their mean intensity relative to the mean intensity of the digital image.

10. A method for automatically processing a digital image to determine image orientation by locating one or more windows that are substantially brighter than their surroundings, said method comprising the steps of:
    processing the digital image to compute a feature image identifying the location of features in the image based on a weighted contribution of edge information, brightness information, information corresponding to lesser spatial activity and occlusion boundary information;
    processing the feature image with one or more morphological filtering operations to provide edge smoothing and pixel filling, thereby generating a filtered image;
    processing the filtered image to identify zero or more regions, wherein the presence of one or more closed regions provides one or more window candidates;
    evaluating at least one of the area and position of the closed regions against certain predetermined heuristic parameters to provide further verification of said one or more window candidates;
    determining orientation of the image based on the location of the verified window candidates in the image.

11. The method as claimed in claim 10 wherein the predetermined heuristic parameters determine whether each closed region is larger than a predetermined proportion of the image and whether a centroid of each closed region appears in a predetermined upper portion of the image.

12. A computer program product for automatically processing a digital image to locate one or more windows that are substantially brighter than their surroundings comprising: a computer readable storage medium having a computer program stored thereon for performing the steps of:
    processing the digital image to compute a feature image identifying the location of features in the image based on a weighted contribution of edge information, brightness information, information corresponding to spatial activity and occlusion boundary information;
    processing the feature image with one or more morphological filtering operations to provide edge smoothing and pixel filling, thereby generating a filtered image;
    processing the filtered image to identify zero or more regions, wherein the presence of one or more regions produces a segmented image;
    logically combining the segmented image with the occlusion boundary information to provide one or more window candidates; and
    verifying that one or more of the window candidates are windows based on their mean intensity relative to the mean intensity of the digital image.

13. The computer program product as claimed in claim 12 further comprising the step of evaluating at least one of the area and position of the regions against certain predetermined heuristic parameters to provide further verification of said one or more window candidates.

14. The computer program product as claimed in claim 13 wherein the predetermined heuristic parameters determine whether each region is larger than a predetermined proportion of the image and whether a centroid of each region appears in a predetermined upper portion of the image.

15. The computer program product as claimed in claim 12 wherein the step of computing a feature image comprises using a Prewitt edge detector to generate edge information.

16. The computer program product as claimed in claim 12 wherein the step of computing a feature image comprises using a minimum total variation filter to generate the brightness information.

17. The computer program product as claimed in claim 12 wherein the step of computing a feature image comprises using an occlusion boundary filter responsive to local intensity differences to generate occlusion boundary information.

18. The computer program product as claimed in claim 12 wherein the morphological filtering operations remove isolated pixels and fill in single-pixel holes in the feature image.

19. The computer program product as claimed in claim 12 wherein the morphological filtering operations include a dilation operation.

20. A method for automatically processing a digital image in response to the location of one or more windows that are substantially brighter than their surroundings, said method comprising the steps of:
    computing a plurality of features from the digital image each of which captures a certain visual characteristic considered to be representative of a bright window representative of an opening in a wall of a structure;
    processing the features to identify one or more bright windows in the image; and
    modifying a processing stage that is operative on the digital image in order to account for the brightness associated with the bright windows identified in the image.

* * * * *